Sept. 17, 1957  R. B. SMITH  2,806,735
UNIVERSAL-OPENING TAIL GATE
Filed March 14, 1955  3 Sheets-Sheet 1

INVENTOR.
RUSSELL B. SMITH
BY
Oldham & Oldham
ATT'YS.

Sept. 17, 1957 R. B. SMITH 2,806,735
UNIVERSAL-OPENING TAIL GATE
Filed March 14, 1955 3 Sheets-Sheet 2

INVENTOR.
RUSSELL B. SMITH
BY
Oldham & Oldham
ATTYS.

United States Patent Office 2,806,735
Patented Sept. 17, 1957

2,806,735

UNIVERSAL-OPENING TAIL GATE

Russell B. Smith, Wooster, Ohio

Application March 14, 1955, Serial No. 493,860

4 Claims. (Cl. 296—51)

This invention relates to tail gates for trucks, wagons, or other vehicles and is especially useful on trucks. The invention provides a universal opening tail gate which may be opened at the top or bottom or at its center at will to unload or spread material carried by the truck.

It is an object of the invention to provide for hinging the gate at will at its upper margin to spread granular material or at the bottom to unload large objects.

Another object is to provide for opening the gate at the middle thereof about vertical hinge axes at its side margins.

A further object is to provide for selective operation of the tail gate from the driver's station.

These and other objects will appear from the following description and the accompanying drawings.

Figure 1:
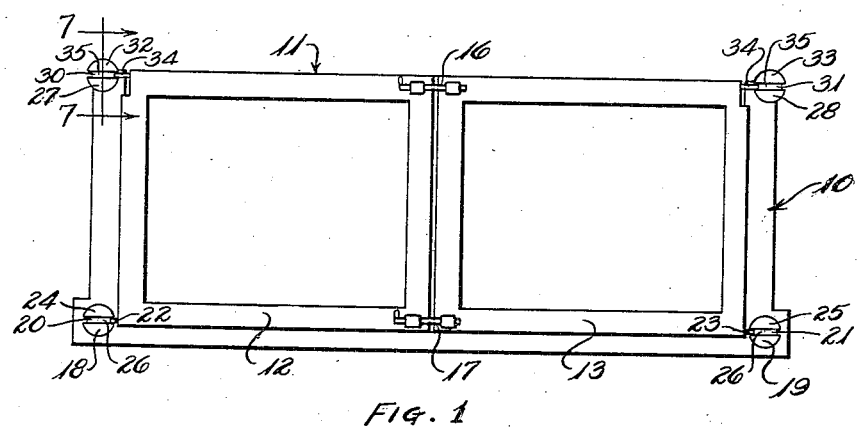
Fig. 1 is a face view of the tail gate of the invention with the gate closed.
Figure 2:
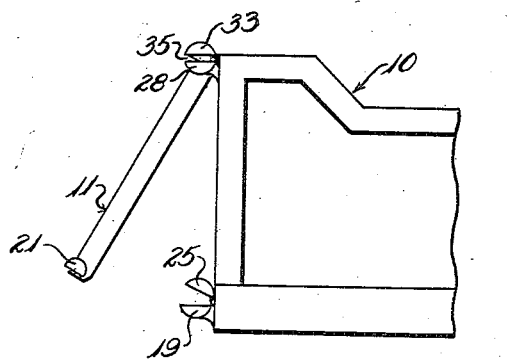
Fig. 2 is a side elevation of the rear portion of a truck with the gate of the invention thereon, the gate being shown as hinged at the top margin and opened at the bottom thereof.

Referring to the drawings which show a tail gate and its mountings constructed in accordance with and embodying the invention, the numeral 10 designates an open-ended truck body having a rectangular tail gate 11 comprising two tail gate members 12, 13. The tail gate members are provided with stepped vertical meeting edges 14, 15 adapted to meet in overlapping relation. The members 12, 13 are adapted to be secured together by bar locks 16, 17 or the like so as to operate as a single tail gate except when the bars are unlocked.

For hinging the tail gate about a horizontal axis at its lower margin, a pair of substantially hemispherically cup shaped hinge bearings 18, 19 are mounted on the truck body 10 with their cupped portions turned upwardly. A pair of downwardly projecting substantially hemispherical pintle members 20, 21 are secured to the gate portions 12, 13 respectively and are supported therefrom by necks 22, 23, the arrangement being such that the spherical pintle members 20, 21 are seated on the hinge bearings 18, 19 and are held thereon by hinged cap members 24, 25 also of spherically cupped formation and complete with the hinge bearings 18, 19 spherical seats for the spherical pintle members. The spherical hinge bearings 18, 19 and their cap members 24, 25 are spaced from each other when in closed condition by an annular space 26 adapted to clear the neck of the pintle member.

For hinging the tail gate about a horizontal axis at its upper margin, similar substantially hemispherically cupped hinge bearings 27, 28 are mounted on the truck body with their cupped faces, such as 29 facing upwardly. Substantially hemispherical pintles 30, 31 are secured to the tail gate over the spherical seats 29 and are retained in place by cupped cap members 32, 33. As in the case of the lower hinge bearings, the spherical pintles 30, 31 are mounted upon necks 34 projecting from the tail gate and the caps 32, 33 are spaced from the spherical hinge bearings 27, 28 by an annular space 35 equal in width to the diameter of the neck 34.

Figure 3:
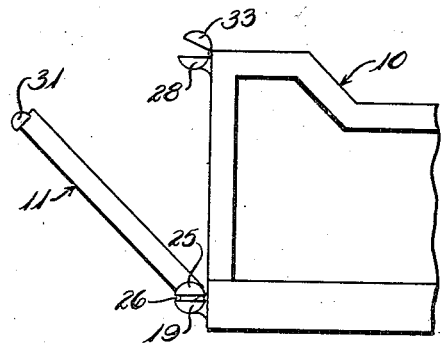
Fig. 3 is a similar view with the gate hinged at its lower margin and open at the top.
Figure 4:
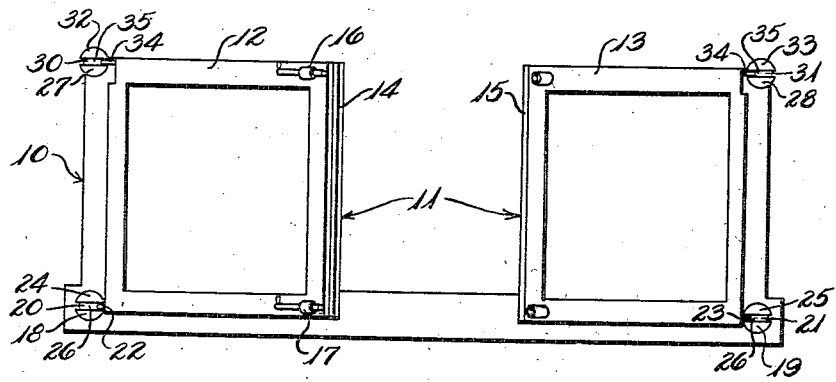
Fig. 4 is a view similar to Fig. 1 but with the gate opened at the center.
Figure 5:
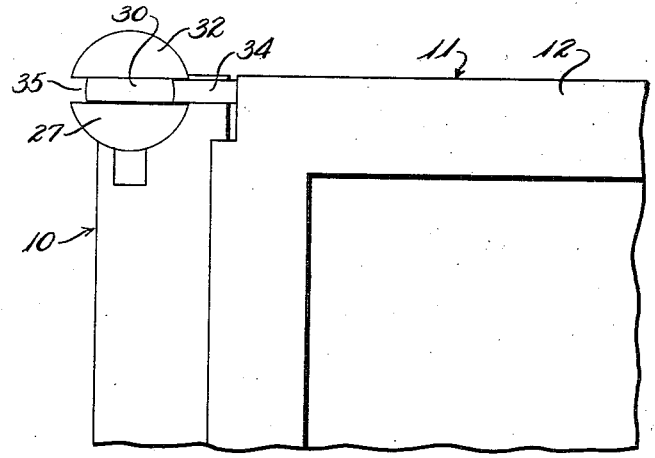
Fig. 5 is an enlarged detail view of the upper left portion of the gate of Fig. 1, other portions being broken away.
Figure 6:
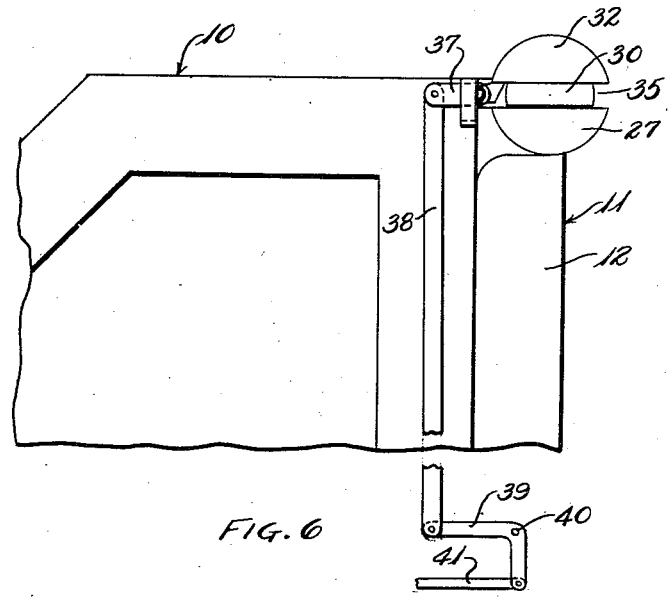
Fig. 6 is an enlarged detail view of the side of the truck at the upper hinge bearing of the tail gate, other parts being broken away.
Figures 7, 8:
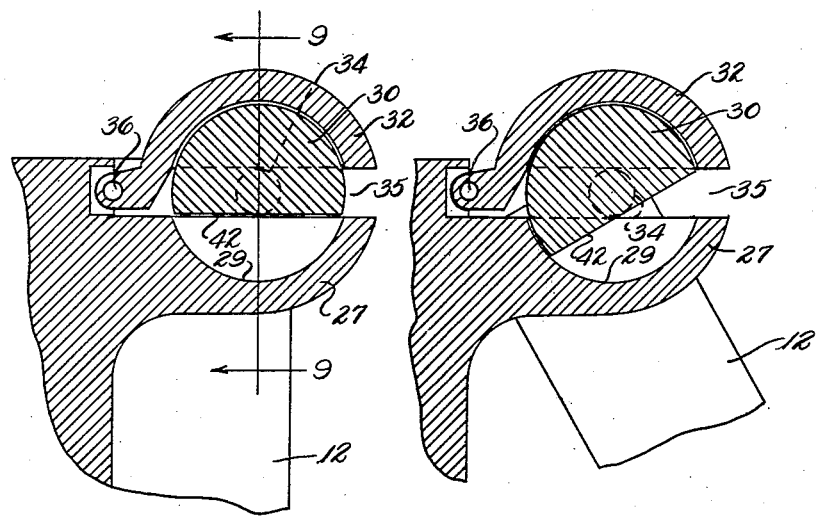
Fig. 7 is a sectional view of an upper hinge bearing, taken on line 7—7 of Fig. 1 with the gate in closed condition.
Fig. 8 is a view similar to Fig. 7 with the gate in open position.

The caps 32, 33 are pivotally mounted on the truck body, as at 36 and are arranged to be locked down in the positions of Figs. 1, 2, 4 and 7 to 9 or to be raised as in Fig. 3 to release the upper pintles and permit swinging of the tail gate about the lower hinge seat. Manipulation of the caps as shown in Fig. 6 may be in any desired manner but preferably is accomplished from the operator's seat as by a lever-operated linkage including an arm 37 integral with the cap 32, a link 38, a bell crank 39 pivotal at 40 on the truck body, and a link 41 extending to the operator's cab. The caps 24 and 25 may be locked or unlocked in similar manner or may be secured by any other ordinary locking means.

Figure 9:
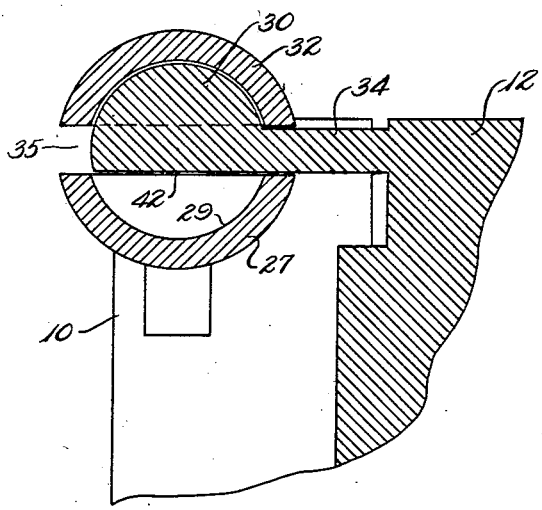
Fig. 9 is a sectional view taken on line 9—9 of Fig. 7 showing the upper hinge bearing with the gate swung open at its center about vertical axes.

It will be observed that with both the upper and lower caps secured in place, the tail gate cannot be swung about a horizontal axis but may swing about vertical axes, as seen in Fig. 9 provided the gate members are free to move independently as by unlocking the bar locks. This is true because the necks 34 of the pintles may travel horizontally about the slots 35 while the spherical faces of the pintles are seated in the caps 32 for horizontal pivotal movement.

Now with the gate members 12 and 13 locked together, raising of the upper hinge bearing caps 32, 33 will permit hinging of the gate about its lower horizontal margin as the flat lower faces 42 of the pintles clear the cupped hinge bearings 27, 28, the gate being supported and hinging freely about the lower pintle pins which rest on the lower hinge bearings. Similarly, raising of the lower hinge bearing caps 24, 25 will permit hinging of the gate about its upper horizontal margin as the flat lower faces of pintles 20, 21 permit clearing the lower hinge bearings.

Preferably the cap members of the lower hinge bearings are arranged to be locked and unlocked from the operator's station as in the case of the upper cap members but independent therefrom so that the operator may release the tail gate at the bottom to dump or spread granular material or may release the tail gate at the top to drop it for unloading large bodies such as furniture or machinery.

Thus it will be seen that the objects of the invention have been accomplished and a gate has been provided capable of hinging about a plurality of horizontal axes and as a divided tail gate about vertical axes.

Variations may be made without departing from the scope of the invention as it is defined by the following claims.

I claim:

1. In combination with a truck having an open-ended body, a rectangular tail gate for closing the end of said body, hinge pintles mounted on each corner of said tail gate, cooperating hinge bearing members on said truck body for receiving said hinge pintles, each pintle comprising a semi-spherical upwardly convex body mounted on a narrow horizontal neck and each hinge bearing member having a cupped upwardly concave spherical seat, and removable semi-spherical downwardly concave cap members spaced above said hinge bearing members by a distance greater than the necks of said pintles to permit horizontal swinging movement and hingedly mounted on said hinge seats and cooperating therewith to retain said pintles, said tail gate being mounted for hinging movement relative to said truck body about any marginal edge of said tail gate by releasing the bearing caps at an opposite edge.

2. In combination with a truck having an open-ended body, a rectangular tail gate for closing the end of said body, said tail gate being secured to said body at each corner of said tail gate by hinge bearing means, each hinge bearing means comprising a hemispherical upwardly open cupped bearing member mounted on said truck body, a hemispherical downwardly cupped cap hingedly mounted on said hinge bearing member and complementary thereto in defining vertically spaced apart opposed spherical seats of common radius therebetween, and a hinge pintle mounted by a neck of circular section on said tail gate and comprising a hemispherical head adapted to be received between said hinge bearing and its cap, the adjacent edges of said hinge bearing and said cap being spaced apart by an annular space substantially equal in width to the diameter of the neck of said pintle, and each pintle member having a flat face with the faces of all said pintle members facing in one direction.

3. A tail gate for a truck, said gate having hinge pintles mounted thereon at each corner thereof and comprising each a hemispherical head supported by a neck of reduced diameter and hinge bearings on a truck body for receiving the heads of said pintles, each hinge bearing having an upwardly cupped hemispherical seat, a downwardly cupped hemispherical cap hingedly secured to said hinge seat and complementary thereto, said cap being adapted in closed position to retain the pintle head in said hinge bearing and in open position to release said pintle, the flat side of said head being arranged downwardly to face said hinge bearing and thereby clear the cupped portion thereof during hinging of said tail gate.

4. In combination with a truck having an open-ended body, a tail gate for closing the end of said body, a pair of semi-spherical upwardly concave lower hinge bearings on said body at the lower margin of said tail gate, a pair of upwardly concave hinge bearings on said body at the upper margin of said tail gate each bearing having a complementary semi-spherical downwardly concave hinge cap hinged thereto and extending thereover, a semi-spherical pintle on each corner of the tail gate, each pintle having its flat side facing downwardly with its spherical side presented to the corresponding bearing cap for being engaged by it, said hinged caps being each adapted to be lowered to lock a pintle to its bearing to permit opening of said tail gate selectively about its margins.

References Cited in the file of this patent

UNITED STATES PATENTS

| 1,356,560 | Sanderson | Oct. 26, 1920 |
| 2,506,849 | Winterton | May 9, 1950 |

FOREIGN PATENTS

| 688,122 | Great Britain | Feb. 25, 1953 |